June 21, 1955 G. H. CANNELLA 2,711,268
NOVEL SYSTEM AND APPARATUS FOR DISPENSING LIQUORS
Filed Aug. 27, 1951 7 Sheets-Sheet 1

INVENTOR
Gaspari H. Cannella.
BY Herbert M. Birch
ATTORNEY

June 21, 1955 G. H. CANNELLA 2,711,268
NOVEL SYSTEM AND APPARATUS FOR DISPENSING LIQUORS
Filed Aug. 27, 1951 7 Sheets-Sheet 3

INVENTOR
Gaspari H. Cannella.
BY Herbert M. Birch
ATTORNEY

June 21, 1955   G. H. CANNELLA   2,711,268
NOVEL SYSTEM AND APPARATUS FOR DISPENSING LIQUORS
Filed Aug. 27, 1951   7 Sheets-Sheet 4
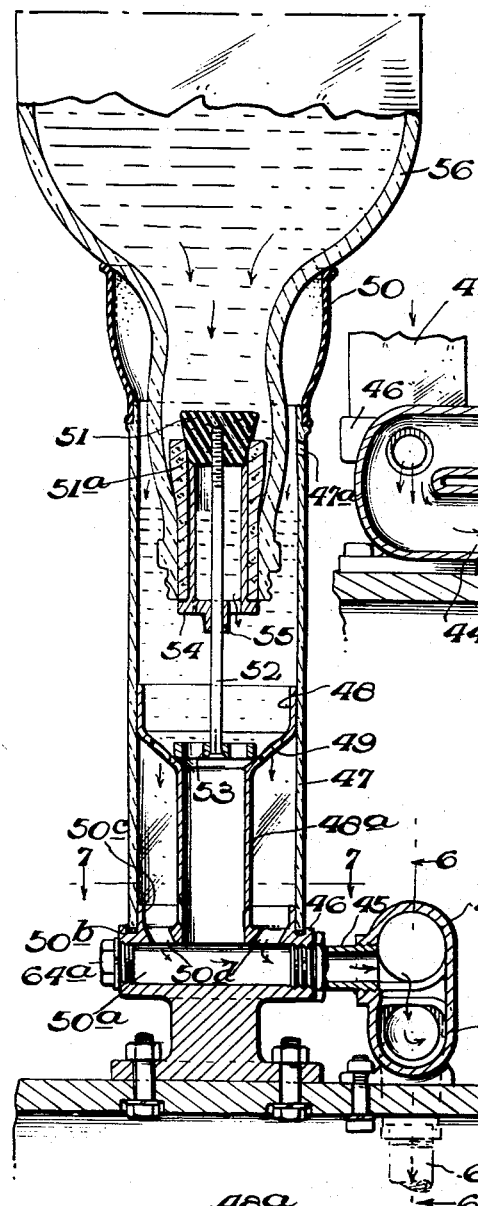
INVENTOR
*Gaspari H. Cannella.*
BY *Herbert M. Birch*
ATTORNEY

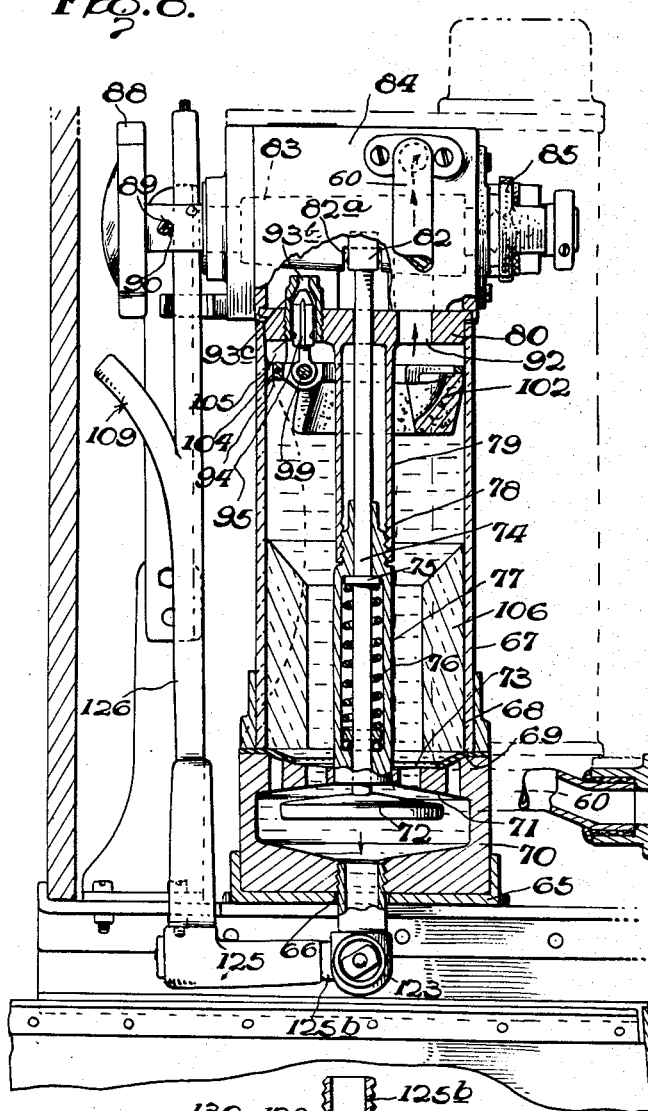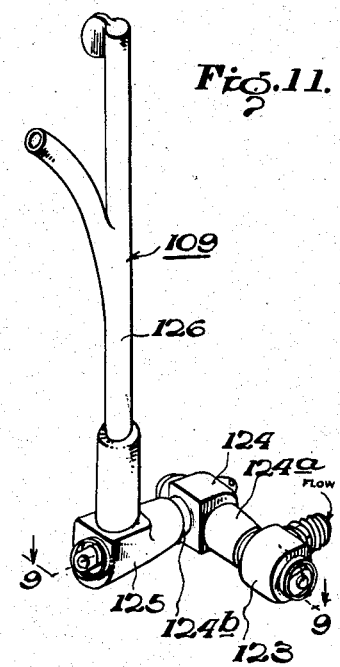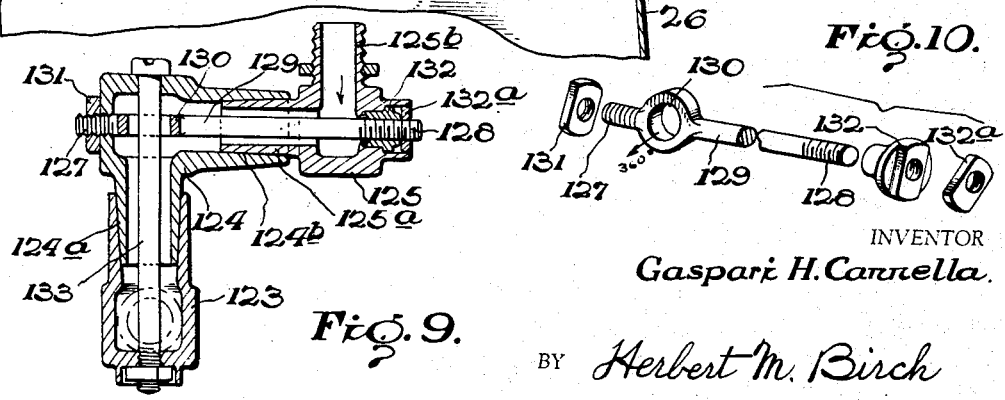

June 21, 1955 G. H. CANNELLA 2,711,268
NOVEL SYSTEM AND APPARATUS FOR DISPENSING LIQUORS
Filed Aug. 27, 1951 7 Sheets-Sheet 6
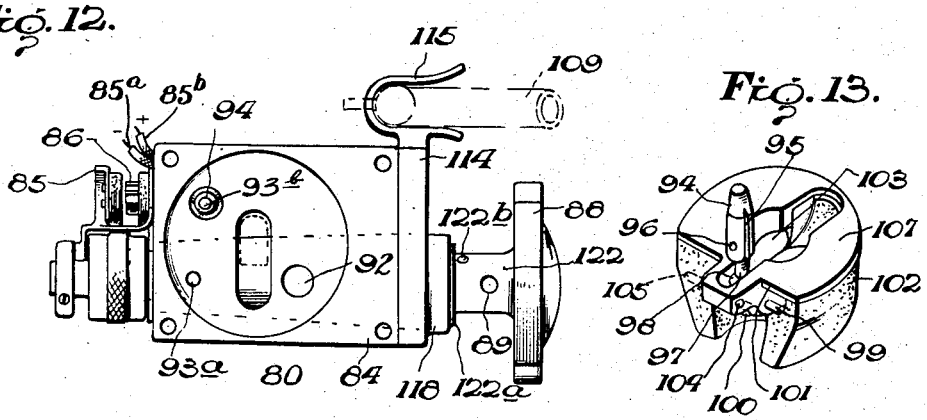
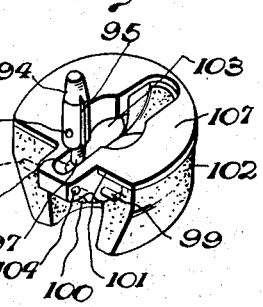
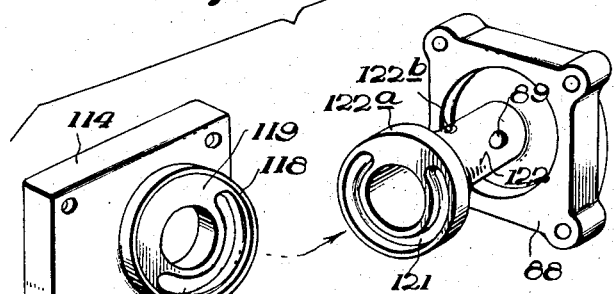
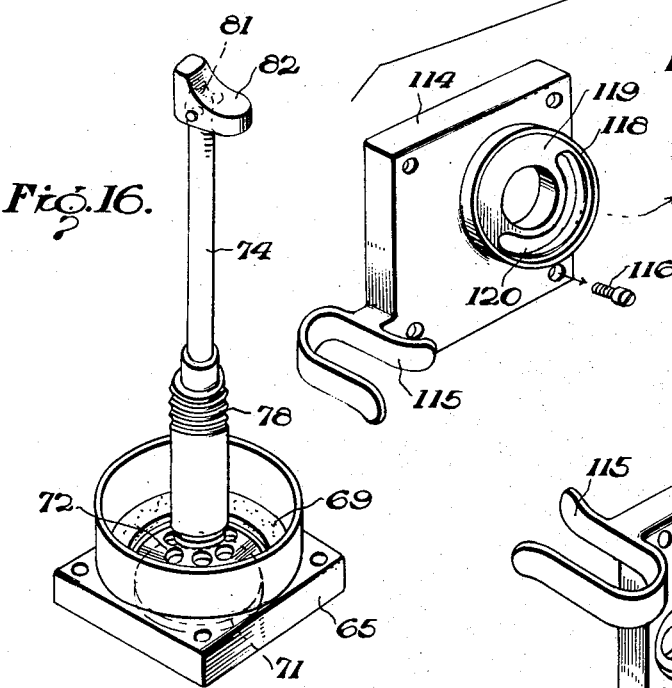
INVENTOR
Gaspari H. Cannella.
BY *Herbert M. Birch*
ATTORNEY June 21, 1955  G. H. CANNELLA  2,711,268
NOVEL SYSTEM AND APPARATUS FOR DISPENSING LIQUORS
Filed Aug. 27, 1951 .  7 Sheets-Sheet 7
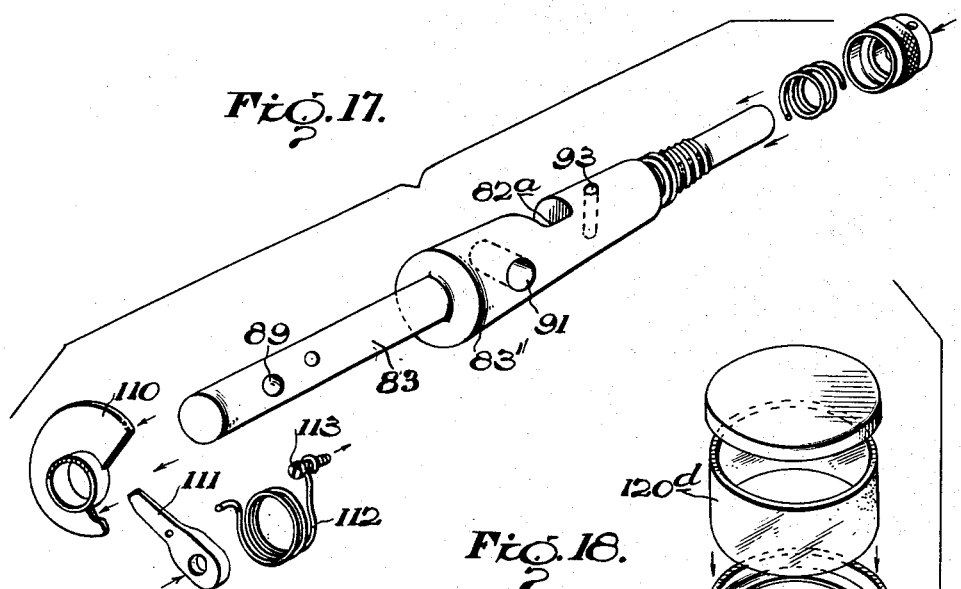
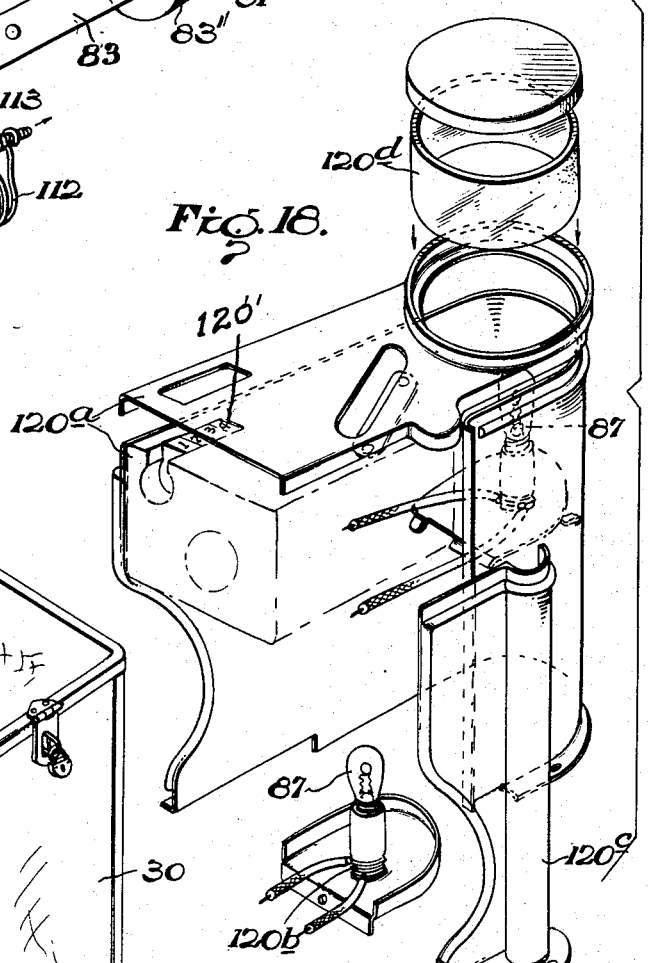
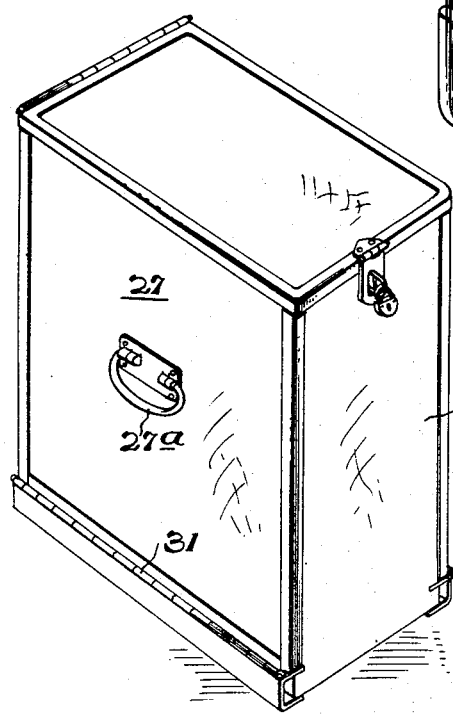
INVENTOR
Gaspari H. Cannella.
BY Herbert M. Birch
ATTORNEY

# United States Patent Office 2,711,268
Patented June 21, 1955

2,711,268
NOVEL SYSTEM AND APPARATUS FOR DISPENSING LIQUORS

Gaspari Harry Cannella, Brooklyn, N. Y.

Application August 27, 1951, Serial No. 243,828

9 Claims. (Cl. 222—36)

The present invention relates to improvements in the novel system and apparatus described and illustrated in my Patent No. 2,634,023, dated April 7, 1953, for dispensing uniform amounts of liquors and simultaneously counting each amount dispensed, and is an improvement of said patent.

This invention and my prior pending application each include the same basic elements, namely:

1. A bar or service counter on which is mounted a cabinet structure including shelves with means for supporting a barometric liquor feeding arrangement having a series feed connection with a double manifold and a row of inverted liquor filled bottles for progressive individual discharge; the manifold and rows of bottles being arranged side by side for selective row discharge; and 2. Special dispenser units with a meter chamber of predetermined volume in connection with the manifold feed line of each individual row of bottles and a counter clock for registering each amount discharged.

Since development of the prior application, which operates very satisfactorily, there have been several improvements made for more convenience and efficiency of operation.

First, for example, when the bottles are serially emptied, it is desirable to arrange the manifold feed line so as to empty each bottle of each row of bottles from the bartender's position at the bar. With such a progressive bottle emptying arrangement, it is not necessary for the bartender to waste time by using a chair or step ladder in order to reach over the leading bottles in a row in order to remove the empty bottles in the rear of the row as it is easy and much quicker for the bartender to reach the bottles in front for removal as they become empty. This saves much time and permits faster service to the customers. Accordingly the invention has improved the manifold feed arrangement for this accomplishment.

Second, the present invention has improved the vent and air supply in connection with the manifold feed lines, to thereby eliminate trapped air sections in the line and provides for instant flow when the meter chamber outlet valve is opened by maintaining the system loaded with liquor free of air trap sections.

Third, the special dispenser unit has been improved by provision of a light switch on the dispenser actuator shaft connected to a source of electric power and circuit connected light bulbs adjacent a bottle and a dispenser in each respective row, so that the customer may see the filling and discharge of his drink as it comes from the row of bottles containing his selected brand.

Fourth, the manual control of the actuator shaft is improved by tapering the same and with a manually turnable knob journalled in the meter chamber distributor block and has formed as a part thereof a novel stop to limit the turn and prevent the actuator shaft from rocking the counter clock lever past a predetermined arc of swing as it registers the next drink to be discharged.

Fifth, the counter lever action is improved by a kick back spring so that when rocked by the cam on the actuator shaft the counter lever is spring returned following each drink discharge, thereby eliminating any possible partial opening of the fluid inlet while the discharge valve is in any degree of open position. This provides for absolute precision of discharge and measurement to the drop.

Sixth, means are provided for improving the gang locking of the actuator shafts and the universally connected discharge taps of each unit, positioned at the front of the units next to the bartender's position to make room for the rotary blade light switch on the opposite end of each shaft.

Seventh, improvement is made in the discharge valve in respect to the spring coiled around the valve stem inside the meter chamber by enclosing and sealing off the spring from contact with the liquor in the chamber, thereby permitting lubrication of the valve stem without danger of contaminating the liquor.

Eighth, the float and air feed and vent structure within the meter chamber is improved by providing a float member having a pivotal connection on a pin carried by the meter chamber closure cap or cover, said float encircling the discharge valve spring enclosing tube and pivotally connecting to a piston rod and piston for control of the air supply and vent to the meter chamber, said piston being connected by a wrist pin with the piston rod thereby permitting the piston to travel always in a substantially straight line and eliminate possible sticking of the piston when out of use for a period long enough to be foiled by the liquor in the unit.

A ninth improvement is the provision of a novel universal joint for the discharge tap from the meter chamber, which will provide flow from the chamber at any point around a 360 degree circumference of swing when the discharge valve is open.

A tenth improvement is the provision of a bottle neck gravity valve structure made to seal off the liquor in the bottle when it is inverted for placement on one of the upstanding vertical open ended bottle neck receiving manifold intake tubes, which valve includes a plunger with a skeleton head adapted to strike the funnel-shaped wall of the open end of each manifold intake tube and hold the gravity valve open when the bottle is mounted neck down in its respective manifold tube.

An eleventh improvement is the provision of a portable knock-down supporting structure for units of this type, whereby special catering service may be extended to private clubs and the like.

The above improvements and many advantages of the present invention over the prior art will appear more fully hereinafter from a consideration of the detailed description which follows, taken together with the accompanying drawings in which the invention is illustrated. It is to be expressly understood that the drawings are for the purpose of illustration only and are not intended to define the limits of the invention, reference being had for that purpose to the appended claims.

In the drawings wherein like reference characters refer to like parts throughout the several views:

Figure 4 is a pulled apart view of the novel bottle stopper feed arrangement used with the present invention.

Figure 5 is a cross-section view of the bottle feed, the gravity stopper and manifold feed lines.

Figure 6 is a longitudinal cross section on lines 6—6 of Figure 5 in the direction of the arrows.

Figure 7 is a top view looking downward from the cross section line 7—7 of Figure 5.

Figure 8 is a longitudinal cross section view of one of the novel dispenser units with parts of the cabinet mounting shown in fragmentary section.

Figure 9 is a fragmentary cross sectional detail view of a novel universal spigot connection for each unit.

Figure 10 is a detailed perspective view of a connecting part of the spigot joint.

Figure 11 is a perspective view of the dispensing spigot and universal connection.

Figure 12 is a bottom plan view only of the distributor block, actuator shaft and electric switch means in elevation.

Figure 13 is a detail perspective view of a liquor discharge controlling float, such as is used in the meter chamber of Figure 8.

Figure 14 is a pulled apart perspective of the actuator shaft control knob and dispenser end plate of one of the dispenser units.

Figure 15 is a detail perspective view of the interior side of the dispenser end plate of Figure 14.

Figure 16 is a perspective view of the liquor discharge valve stem, its cam head and the perforated plate covering the valve seat structure.

Figure 17 is a pulled apart view in perspective of the actuator shaft and its intimate parts.

Figure 18 is a pulled apart perspective of a dispenser unit cover and its respective light bulb sockets.

Figure 19 is a perspective view of a portable unit folded for shipment.

The drawings will now be referred to in detail under the headings of the several respective basic parts of the system and apparatus.

*The system and apparatus support structure*

Figure 1:
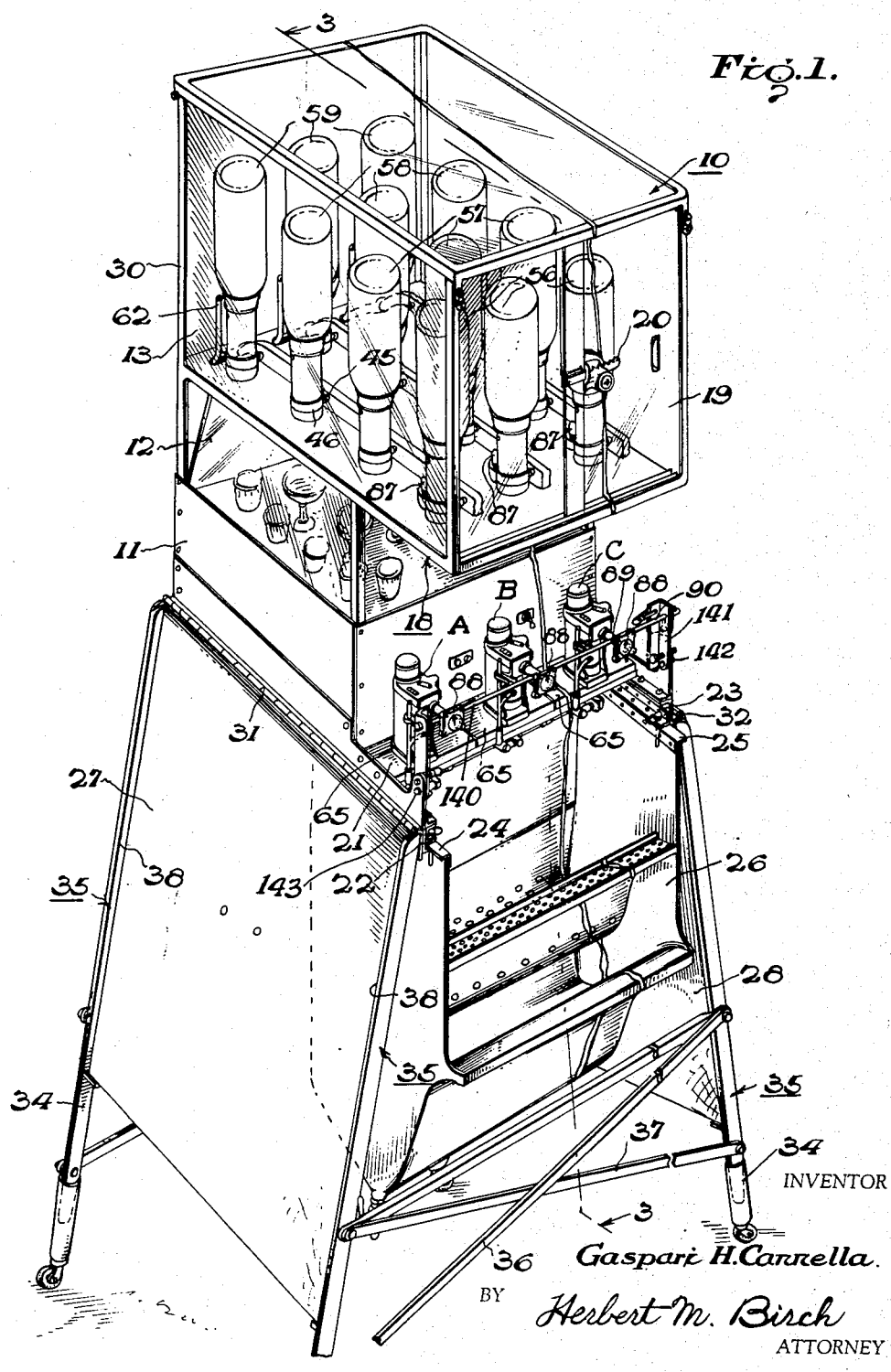
Figure 1 is a side perspective view of one form of stand structure for a dispenser cabinet and unit arrangement according to the present invention.
Figure 2:
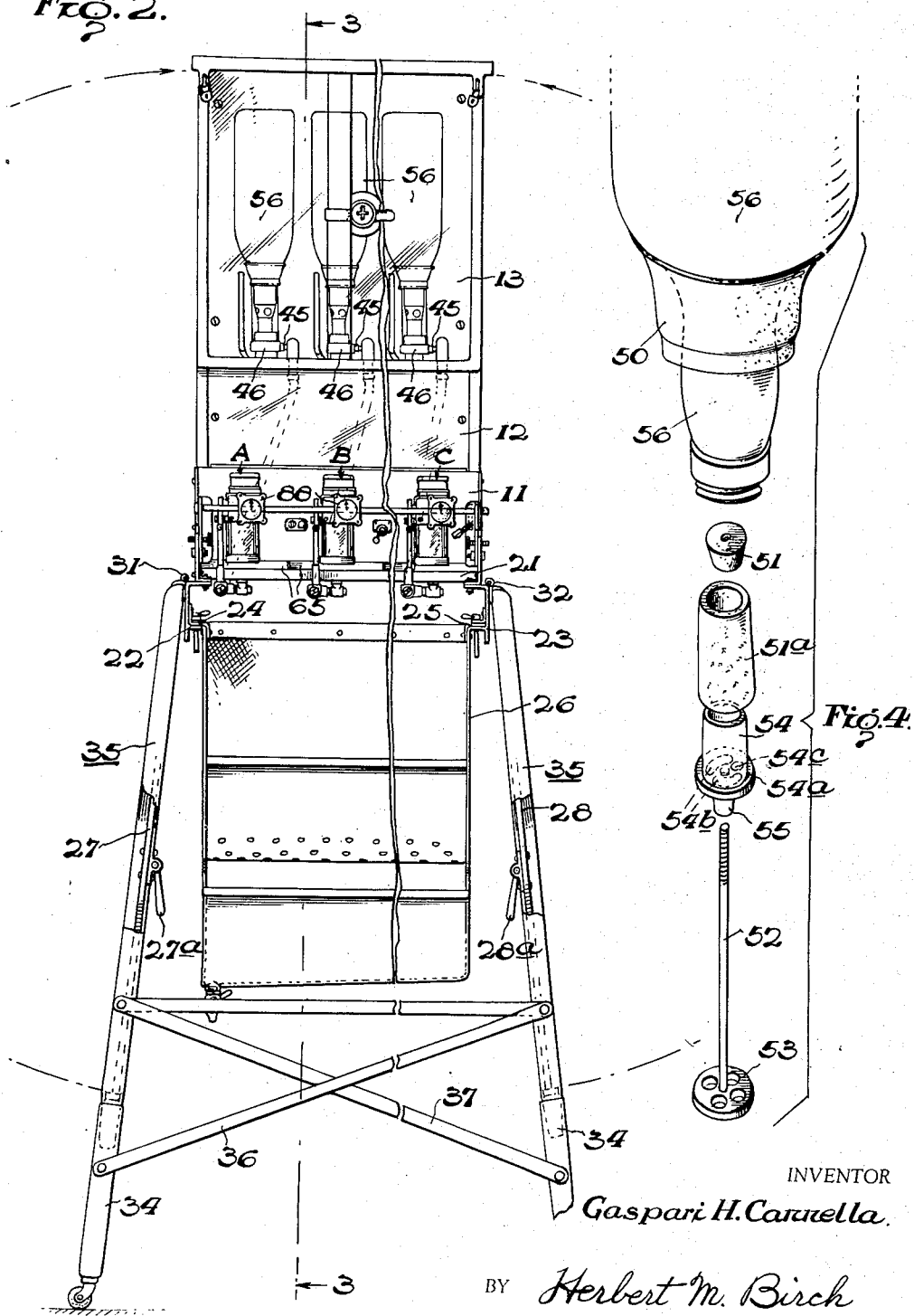
Figure 2 is a view of the device of Figure 1 taken from the bartender's side.
Figure 3:
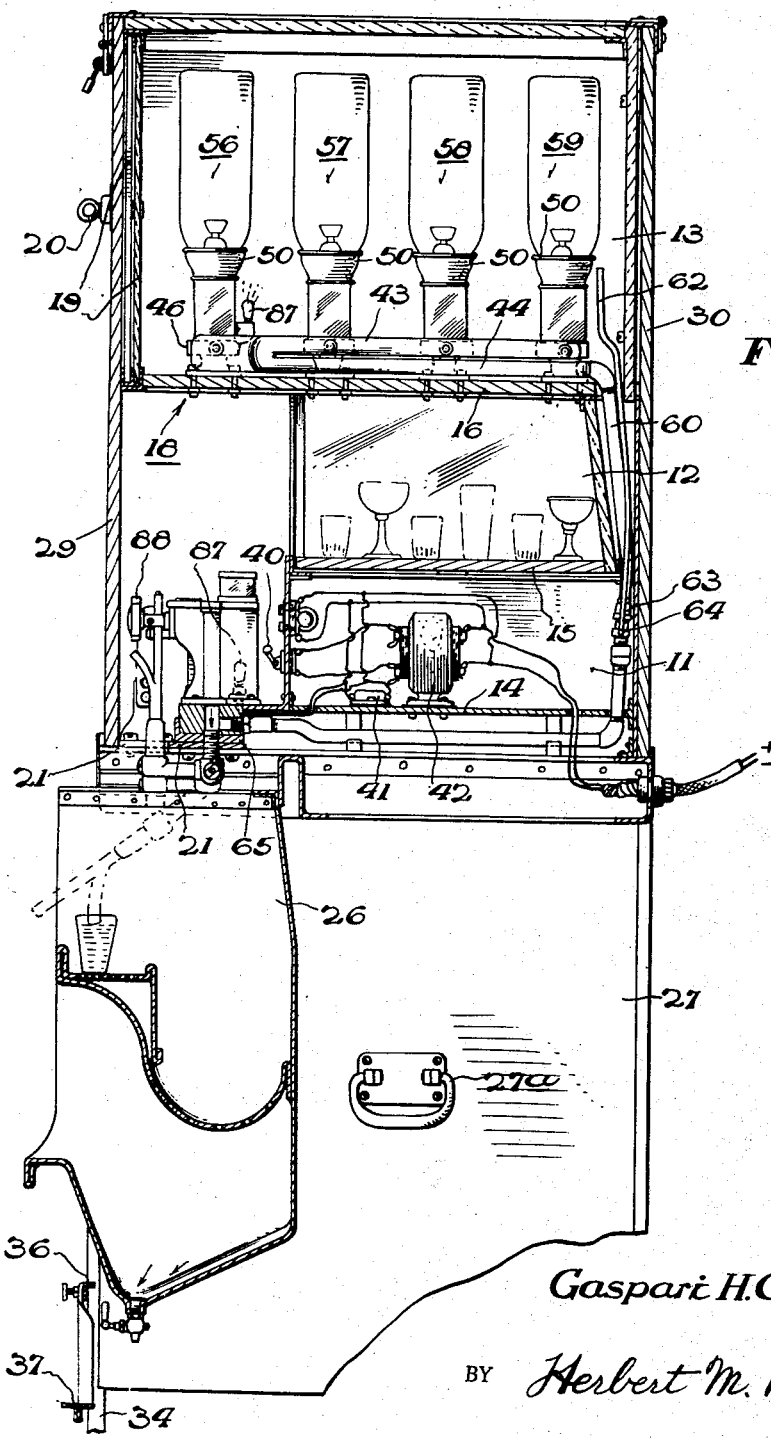
Figure 3 is a side cross section taken along the line 3—3 of Figure 1.

The support structure for the apparatus in general use on large bars is a permanent fixture and it may be made in sectional units placed side by side along the length of the bar. However, as illustrated in Figures 1, 2 and 3 a separate unit may be provided and made mountable in a portable stand and cabinet arrangement. The operation and structure is the same as for the permanent dispenser unit, but there may be a reduction in size and weight. The portable arrangement comprises a cabinet portion 10 divided vertically into compartments 11, 12 and 13. The bottom wall 14 of the lower compartment, see Figure 3, serves as the bottom wall of the portable arrangement when in folded up position as shown in Figure 19, and the top wall 15 of compartment 11 and also as the bottom wall of compartment 12, while the top wall 16 of compartment 12 in turn serves likewise as the bottom wall of top compartment 13. The side walls of the cabinet 10 are common to the several compartments with the exception of the top compartment 13 containing the feed manifold and bottle holders, to be described under their heading, which compartment has an overhanging front portion 18 with sliding glass doors 19 and a lock 20 therefor. Below the overhanging bottom of portion 18 mounted on a support plate 21 are a plurality of dispenser units, to be described hereinafter in detail.

Extending from under each side of the plate 21 and bottom of the cabinet are longitudinally spaced apart grooved side rails or bars 22 and 23. The grooves in these rails face each other for the purpose of receiving flanges 24 and 25 of a compartment trough 26 to be inserted after the unit is unfolded and set up for use.

The cabinet 10 is completely enclosed on three sides by pivoted side panels 27 and 28 each with a handle 27a and 28a, a removable front panel 29 and the fourth rear side, is a solid wall of the cabinet itself, see numeral 30 of Figure 3. Each side panel 27 and 28 is mounted on an elongated hinge 31 and 32, respectively, along the outside edge of their respective side rails 22 and 23, so as to permit these side walls to be swung downward from around the cabinet. Panels 27 and 28 provide the major parts of a supporting structure including legs 34 having rollers on one end and elongated angle bar sockets on the other end for telescopic connection over angle bars 35 along each longitudinal edge of the respective panels 27 and 28 and extending below the free end edge thereof. When the legs are slid over the extended ends of the panel angle bars the panels and legs are connected together by cross braces 36 and 37 extending therebetween. The braces are formed with apertured ends for alignment with bolt openings in the leg members and panel angle bars.

The angle bars of the side panels are connected so that one leg of each bar along the respective longitudinal edge of each panel provide a flange 38. These flanges project from the inside of their respective panels 27 and 28 when folded to embrace the vertical edges of the cabinet 10 at the rear wall 30 and at the front embraces the front closure panel 29, as shown in Figure 19. Thus when folded with the legs and braces removed the unit may be locked and shipped without the need of a separate shipping crate.

The compartments of the cabinet 10 each are some useful part of the system's equipment. For example, compartment 11 houses the electric master control switch 40, a fuse 41 and transformer 42 from a source of supply, compartment 12 is a glass walled compartment for display of various glassware to be used for the drinks dispensed and compartment 13 is a glass walled display arrangement for the feed manifolds, their respective vertical bottle holding feed tubes, and the bottles of liquor to be displayed and emptied according to customer demand.

*The manifold feed arrangement (Figs. 3, 5 and 6)*

The double manifold series feed arrangement in the top display chamber or compartment 13 comprises a looped or double tubing formed of continuous superimposed upper and lower sections 43 and 44. The upper section 43 is formed with longitudinally spaced apart openings for connector bushings 45 opening into an annular supporting ring 46 counterbored to support a glass tube 47. This structure is duplicated for each manifold connection, hence a description on one manifold bottle support and their respective connections is sufficient for an understanding of this part of the invention. Inside each of the glass support tubes is a central upstanding bottle tip enclosing funnel 48 formed with liquid outlet openings 49 and around the upper rim of the support tube is a rubber seal cup 50 adapted to make a seal connection with bottle body below the neck. The funnel 48 continues into a tubular portion 48a formed on its end opposite to the funnel with an annular housing 50a. This housing is relatively larger than the diameter of the tube 48a so as to provide a surface 50b with an upstanding collar 50c for fitting within the base of glass tube 47. Within the collar at the base of tube 48a are drain openings 50d adapted to drain off spilled over liquor, collecting between the interior wall of tube 47 and the exterior wall of tube 48a into the feed manifold. Also when using the rubber seal cup 50 an air vent 47a is provided in the tube 47 just below the cup to accelerate the bottle feed.

As shown in the pulled apart perspective view in Figure 4, each bottle has a special stopper gravity valve 51 arranged to normally cut-off any flow of the bottle contents when the bottle is inverted out of the unit or bottle support tube. This valve comprises a reciprocating rod 52 having a perforated weight, such as disk 53 on one end, the conical cut-off valve 51 on the opposite end seating on the rim of an annular hollow bottle stopper 51ª containing a metal tube 54, and a second disk 54ª having a vertical guide bearing 55 in which the valve rod 52 reciprocates to cause the valve 51 to close by gravity resulting from the weight of the valve and the first disk 53 when the bottle is inverted prior to insertion of the neck into the tube and bottle lip enclosing funnel 48. The disk 54ª includes outlet slots 54ᵇ and an air inlet 54ᶜ. When in this inverted position with the valve closed the rod and disk 53 project downward a greater distance than the depth of the neck receiving tube and funnel so that when inserted therein the side walls of the funnel 48 push the rod upward and the valve 51 is opened to permit flow into the system from the row of aligned series connected glass tubes into the manifold pipe. For example, as shown in Figures 3 and 5, the bottle number 56 is in the position of least resistance to flow and hence discharges its contents first, then bottle 57, 58 and 59 dispense in consecutive order as drawn upon.

The lower manifold section 44 leads down feed pipe 60 to the dispenser unit and the upper conduit 43, see Figure 3, connects to the liquid inlet opening in the dispenser distributor block. An air vent pipe 62 opens adjacent bottle support tube and extends to a coupling 63 formed with a vent opening 64, Figure 6. This vent pipe keeps the feed line clear of trapped air and is important for precision dispensing and instant action. A plug 64ª is provided for removal to permit connection with additional feed units.

*The dispenser unit and counter means*

The several dispenser units A, B, and C are each identical in structure and hence only one of the units will be described. Each unit comprises a base 65 of suitable metal. The base is rectangular and secured at each corner by bolts to the support plate 21 extending between the side rails 22 and 23 referred to in the description of the apparatus support structure, see Figure 2. This base 65 is formed with an opening 66, see Figure 8, for the spigot or tap joint for final dispensing of the measured drink, from a glass meter chamber 67, which may be made with different size bores to dispense, for example ½, 1½ or 2 ounce quantities or any quantities desired. The base of the glass chamber 67 has an external diameter at its lower end 68 adapted to seat on the annular shoulder 69 of an upstanding wall formed from a valve housing 70 having therein an opening defined by a valve seat 71 for co-action with the discharge valve 72. The main valve opening is covered by a perforated plate 73 which has a central vertical hollow nipple 77 extending upward around the elongated valve stem 74 of valve 72. The upper exterior bore of this nipple is formed with threads 78. The valve stem 74 as in my prior copending application above-referred to is made with a transverse opening for a spring stop collar 75 and a coiled spring 76 is mounted around the valve shaft or stem 74 and is under compression between the top of perforated plate 73 and the stop collar 75.

The threads 78 on the upper exterior bore of the valve stem nipple or housing thread into an internally threaded nipple 79 carried by the central underside of the centrally apertured meter chamber cover plate 80. Thus when the central aperture of the cover plate 80 is engaged over the top of valve stem 74 all of the said stem inside the meter chamber 67 is completely sealed off from any liquor in the meter chamber and the interior of the nipples may be packed with suitable means and lubricant and the upper rim of the meter chamber 67 is sealed to the plate 80 by gasket means or the like, as in Figs. 8 and 12.

As in my prior co-pending application the extended end 81 of the valve stem, see Figure 16, mounts a cam follower head 82 engageable by a cam sector 82ª on a tapered actuator shaft 83 with a rotary valve 83' turnably mounted in a distributor block 84 above the cover plate 80. The actuator shaft 83 on one end beyond the block 84 carries a multiple contact switch well known in the art and includes a rotary blade element 85 of an insulated switch plate having spaced contacts 86 for operating series connected light bulbs 87 adjacent each row of bottles and each dispenser unit. The opposite forward end of the shaft 83 has secured to it an operating hand knob 88 and back of the handle the shaft is bored into a transverse opening 89 for receiving a lock rod 90, see Figure 2. The intermediate part of the shaft 83 is tapered toward the switch end and is confined in a complementary tapered bore in the distributor head 84. This tapered section is formed with a liquor inlet opening 91 from supply line 60 to register with a corresponding inlet opening 92 in the cover plate, which fits in the counter bored underside of the distributor block 84, see Figures 8 and 12. Nearer the smaller end of the tapered actuator shaft section is a transversely bored inlet air vent 93 with its axis at right angles to the axis of the inlet opening. This air inlet is open only when the inlet openings 91 and 92 are disaligned and aligns with a similar inlet air vent opening 93ª in the cover plate 80, see Figures 12 and 17.

The cover plate 80 also includes an air inlet opening 93ᵇ, which is always closed when the meter chamber is full. A bushing 93ᶜ extends upwardly around the opening and the underside of the cover plate is formed with a downwardly flaring bore to receive the tapering end of a float controlled valve with a lower hollow skirt 94 formed with exterior side grooves 95, see Figures 8 and 13.

This valve is free to move or rock on a wrist pin 96 mounted transversely through the skirt of the valve 94 and is pivotally connected to a shaft 97 with the opposite end thereof formed with an eyelet 98 for receiving a hinge pin 99 fitted in spaced apart lugs 100 and 101 on float 102. The float is formed with a central key hole opening 103, fits over and around the valve stem enclosing nipples and is pivoted on the pin 104 held in position between spaced apertured lugs 105 on the underside of the cover plate 80. A plate 107 having an opening and shape complementary to the top surface of the float may be provided to reinforce the cork material of the float. When the float 102 is raised by the liquor in the meter chamber 67 the reduced part of the key hole opening therein is raised from contact with the curved side of the spring housing and the air intake is closed. The air intake is always closed until the discharge valve 72 is opened which likewise opens the air inlet vent 93 and the meter chamber 67 is discharged through the tap or universally mounted spigot 109. Within the meter chamber is an inner ring or bushing 106, which is replaceable with different diameter to regulate predetermined quantity dispensing.

Each time the actuator shaft 83 is turned to cam open the discharge valve, a second cam 110 forces the counter lever 111 adjacent thereto downward against the resistance of a coil spring 112. A counter 120' is mounted in the distributor block 84 and the indicia of the counter is exposed through a window in the block. One end of the coil spring 112 is anchored to the block by a set screw 113 and the opposite end is similarly anchored or tethered to the counter lever 111 so that the spring normally biases the lever to a raised position. Thus when the cam forces the lever downward to click the counter one digit, the spring will return the lever to normal position upon release of the cam action, see Figures 8 and 17. An end plate 114 with an integrally formed U-shaped tap retainer 115 has an opening bored through it and is counter-bored at 114ª on one side of the opening to fit over the second cam 110 and the end of the counter and lever 111 and over the end of the actuator shaft 83, see Figure 15. Each corner of the plate 114 is formed with a bolt opening for alignment with a similar opening in each corner of the end face of the distributor block 84 to receive the securing bolts 116, see Figure 14. The front of plate 114 includes a circular collar or bushing 118 annularly spaced around the shaft opening on the exterior or front surface of plate 114 so as to leave an annular land 119. On the land 119 is an arcuate stop 120, and the free end of the actuator shaft 83 extends beyond the extent of the collar and arcuate stop to mount the hand knob 88, see Figure 8. This knob on its underside continues into a hollow shank 122 formed with an annular enlargement 122ª adapted to fit for turning movement inside the collar 118. The enlargement is bored out in the front face thereof to form an arcuate groove 121 slightly more extensive circumferentially than the arcuate stop 120, but of the same radius so as to engage over the stop and permit a limited turn of the handle in a counter-clockwise direction, for example 90 degrees. The hollow shank 122 fits over the end of the actuator shaft 83 and is secured thereto by a set screw 122ᵇ. Each counter-clockwise turn of the knob is limited by the stop 120 in proportion to the calibrated swing of the counter lever 111, which clicks the counter for each discharge of the meter chamber 67. After the knob is turned counter-clockwise according to the extent permitted, the knob is then manually returned to chamber filling position.

Each unit A, B, and C may have a sheet metal unit conforming cover 120ª with threaded bulb sockets 120ᵇ and a second cover 120ᶜ for conforming to the inlet feed pipe in the distributor block 84. Also mounted on the top of each unit is a brand ring 120ᵈ for giving the name of the liquor being dispensed.

*The universal tap connection for the dispenser unit*

Mounted for 360 degrees global movement is the novel tap or spigot 109. The tap is formed in four sections 123, 124, 125 and 126. The first section 123 is a hollow coupling housing with a transverse bore flared at one end and alignable with the second hollow coupling 124, which is formed with hollow tapered nipples 124ª and 124ᵇ at substantially right angles to each other. Nipple 124ª is adapted to wedge fit into the flared end of the section 123, while nipple 124ᵇ is internally flared and fits around a tapered nipple 125ª of section 125. The section 125 is formed with a hollow exteriorly threaded nipple 125ᵇ threadable into the internally threaded socket 66 in base 65 and valve block 70 of its dispenser unit as shown in Figures 8, 9 and 11.

The second and third sections 124 and 125 are formed at each end with bolt openings for permitting the projection therefrom of the opposite threaded ends 127 and 128 of a special connecting bolt 129. This bolt includes an eyelet or ring 130 formed therefrom adjacent the threaded end 127 projecting from the second coupler section 124. The ring 130 is confined within the bore of the section 124 and coupling nuts and lock nuts such as the single lock nut 131 and the double lock nuts 132 and 132ª are threaded in place on the projecting bolt ends with the bore of the ring axially aligned with the bore of the third hollow coupler section 125. The double lock nut arrangement permits adjustment and setting of the parts to compensate for wear to stop any developing leakage. The first section 125 is formed with a tapered bore 125ª which wedges into the tapered nipple 124ᵇ of the second coupler 124 at substantially right angles to the axial bore of its tapered nipple 124ª. When inserted in position the first and second coupler sections are hold together by a second elongated headed bolt 133 having a portion of its shank passing through the eyelet or ring 130 as illustrated in Figure 9.

The fourth section 126 includes the tap or spigot tube having the general numeral 109, which tube extends at right angles from the side of the third coupler section 125. Liquid dispensed from the meter chamber 84 when the discharge valve is open flows into the sections 123, 124, 125 and 126 in the order named and the tap tube and section 125 may be turned 360 degrees on the tapered nipple 124ᵇ, if desired, or turned 360 degrees on the tapered nipple 124ª, if desired, to accommodate various dispensing positions.

*Operation*

The machine prior to actual operation must first be loaded by inserting the inverted bottles of liquor in their respective rows at the several intake tubes of their respective manifold feed lines. This inverted bottle insertion operation is facilitated by the gravity closing valved stopper shown in Figure 4. When this is done the entire unit becomes loaded with the fluid from the bottle and the meter chamber will be filled although the units may still be gang locked by locking bar 90 extending through alignable openings in the actuator shaft 83 back of the handles 88, because the respective supply inlet openings in the cover plate 80 and the actuator shaft 83 are aligned for intake from their respective feed line.

All that is necessary to dispense a drink is to turn the knob 88 slightly to stop position and while so doing the inlet openings are disaligned or cut off from the supply line 60; the first cam 82ª forces the discharge valve open, permits the float piston 94 to drop and admit air to the meter chamber and simultaneously aligns the inlet air vent 93 with the inlet vent 93ª in the cover plate 80. Also simultaneously the second cam 110 rocks the counter lever 111 against the action of return spring 112 to count the next drink to be loaded into the meter chamber. After discharge from the tap, the tap tube 126 may be swung laterally into the U-shaped keeper 115 until next needed. With the tap in the raised inactive position the locking bar 140 may be placed in position and thereby lock the tap in this position. The lock bar 140 may be anchored at each end in a pivoted angle bar 141 mounted on a pin 142 projecting through an ear 143 formed on each end of the forward side rails 22 and 23 of the cabinet 10.

As explained in the foregoing description the bottles of each row selected will serially empty and the manifold feed line will be vented as required by the vent opening 64 and upstanding air pipe 62 for each manifold feed tube 60—61.

While only one embodiment of the invention is described, it is to be expressly understood that various changes may be resorted to within the scope of the appended claims.

I claim:

1. A dispensing system for liquors and the like comprising a cabinet for bars having a shelf separating the cabinet into compartments, a plurality of spaced apart manifold feed lines extending from front to back of the upper compartment, aligned spaced apart liquor inlet openings formed in each manifold feed line, open ended bottle support tubes having a feed opening at the bottom and each connecting with an opening in the said feed line, said tubes each enclosing a second tube formed with a funnel head and opening into the feed line connections, a valve closure in the bottle neck adapted to close by gravity when the bottle is inverted neck down, said funnel head serving to push said valve open after the inverted bottle is placed in position on the support tube, and a feed conduit leading from an end of the said manifold feed line to a dispenser unit, said inverted bottles in each row filling said manifold and feed line with liquor for feeding liquor into their respective manifold feed lines in series, to thereby successively discharge each bottle of each respective feed line from the bartender's side of the cabinet to the customer's side.

2. The system described in claim 1, wherein the bottle support tube includes a rubber sealing member for seating around a bottle inverted therein, and wherein said support tube is formed with a vent below said sealing member.

3. The system described in claim 1, wherein the said feed conduits each connect with a vertical upstanding air tube for manifold feed line, said connection between each of said feed conduits comprising a coupling with a vent opening to the said air tube, to thereby eliminate air from the respectively connected said feed lines and said feed conduits.

4. A dispenser unit for a barometric liquor feeding system comprising a meter chamber adapted to hold a predetermined quantity of liquor, a distributor block formed with an axially tapered opening therethrough, an inlet opening in the block connecting to the liquor feeding system, a vent opening formed in said block, an actuator shaft having an intermediately tapered section fitting in the axially tapered block opening and having each end projecting from opposite sides thereof, an operating knob on one projected shaft end, an electric switch blade on the opposite projected shaft end, cooperating switch blades fixed to the block adjacent the said blade on the shaft end, electric wires leading to a source of power and to electric bulb sockets, said sockets each being adjacent their said respective meter chambers, said tapered shaft section having an inlet opening alignable with said inlet opening in the block to fill the meter chamber and having a vent opening therein with the axial bore substantially at right angles to the axial bore of the shaft inlet opening, said shaft vent opening being alignable with the block vent opening upon disalignment of said shaft and block inlet openings, a first and second cam surface on the shaft, said first of said cam surfaces being in engagement with a valve stem extending through the meter chamber, a valve seat in the bottom of the meter chamber, a discharge valve carried by said stem and normally spring biased to seat on said valve seat, until forced open by said first cam surface when the said shaft is turned to close off the liquor inlet, and a counter lever actuated by said second cam as said discharge valve is opened and said switch circuit is closed.

5. The unit described in claim 4, wherein the counter lever is spring biased to inactive position and thereby returns after each cam actuation thereof when the said shaft is returned to refill position after each drink discharge.

6. The unit described in claim 4, wherein the said valve stem is encircled by a coil spring and spring enclosing means are provided to seal off the spring from contact with liquid in the meter chamber, thereby permitting lubrication of the spring without contaminating the liquor in the meter chamber.

7. A liquor dispenser connected to a remote source of supply comprising a base, a predetermined quantity chamber detachably mounted on said base, a plate with an air inlet and air outlet openings and an inlet opening connected to the source of supply for supplying liquor into the chamber, an operating shaft including a liquor inlet and an air outlet opening with its bore at right angles to said inlet opening, a cam surface formed in the shaft offset circumferentially from the shaft inlet opening, an outlet valve at the bottom of said chamber, said cam serving to open the outlet valve when said operating shaft is turned approximately 90 degrees and to disalign said alignable inlet openings and align said air outlet openings, a float in said chamber and a piston movable in the said plate to open said air inlet opening whereby a measured quantity in the said chamber is dispensed.

8. A liquor dispenser connected to a remote source of supply comprising a base, a predetermined quantity chamber detachably mounted on said base having a cover plate with an inlet opening connected to said supply source, an operating shaft including an opening alignable with said inlet opening in the cover plate, a cam surface formed in the shaft offset circumferentially from the shaft inlet opening, an outlet valve at the bottom of said chamber, said cam serving to open the outlet valve when said operating shaft is turned and to disalign said inlet openings whereby a measured quantity in the said chamber is dispensed, said operating shaft being formed with a second cam surface, a lever in the path of said second cam, a spring holding said lever in an inactive position, operating means for a counter connected to said lever for counting each measured quantity dispensing turn of the shaft required to dispense each measured quantity from said chamber, a knob secured to said shaft and stop means adapted to limit the turn of the shaft by said knob for each measured quantity discharged.

9. An individual predetermined amount liquor dispenser connected to a remote source of liquor supply comprising a supporting base mounted on a bar or the like, a liquor receiving chamber of predetermined volume, means mounted over the top of said chamber, a manually controlled rotary inlet valve at the top of said chamber, a fluid inlet reservoir, an outlet valve at the bottom of said chamber adapted to be cyclically opened after the inlet valve has been opened to fill the chamber and subsequently closed, a liquor closed air inlet responsive to the opening of said outlet valve and fluid discharge, comprising a hollow cylinder mounted in the top of the said chamber, a piston in said bushing, a float connected to said piston normally elevated by the liquor to close said air inlet provided by the hollow cylinder until said outlet valve is opened, said piston being movably connected to said float to provide straight line movement in the said cylinder to prevent possible sticking.

References Cited in the file of this patent

UNITED STATES PATENTS

| | | |
|---|---|---|
| 141,619 | Auld | Aug. 12, 1873 |
| 171,683 | Miller | Jan. 4, 1876 |
| 1,649,159 | Fesler | Nov. 15, 1927 |
| 2,129,113 | Bancons | Sept. 6, 1938 |
| 2,198,524 | Berwick | Apr. 23, 1940 |
| 2,453,080 | Shimp | Nov. 2, 1948 |
| 2,562,212 | Rogers et al. | July 31, 1951 |